(12) United States Patent
McShane

(10) Patent No.: US 11,132,754 B2
(45) Date of Patent: Sep. 28, 2021

(54) SYSTEMS AND METHODS FOR PROVIDING FLUID RESOURCES

(71) Applicant: Baltimore Gas and Electric Company, Baltimore, MD (US)

(72) Inventor: Michael McShane, Baldwin, MD (US)

(73) Assignee: BALTIMORE GAS AND ELECTRIC COMPANY, Baltimore, MD (US)

( * ) Notice: Subject to any disclaimer, the term of this patent is extended or adjusted under 35 U.S.C. 154(b) by 975 days.

(21) Appl. No.: 15/691,205

(22) Filed: Aug. 30, 2017

(65) Prior Publication Data

US 2018/0060977 A1 Mar. 1, 2018

Related U.S. Application Data

(60) Provisional application No. 62/381,805, filed on Aug. 31, 2016.

(51) Int. Cl.
| | |
|---|---|
| *G06Q 50/06* | (2012.01) |
| *G01D 4/02* | (2006.01) |
| *G06Q 10/06* | (2012.01) |
| *G01F 15/00* | (2006.01) |
| *G01F 15/075* | (2006.01) |

(52) U.S. Cl.
CPC ............ *G06Q 50/06* (2013.01); *G01D 4/02* (2013.01); *G06Q 10/06315* (2013.01); *G01F 15/00* (2013.01); *G01F 15/0755* (2013.01); *Y02B 90/20* (2013.01); *Y04S 20/30* (2013.01)

(58) Field of Classification Search
USPC .......................................... 702/181, 99, 182
See application file for complete search history.

(56) References Cited

U.S. PATENT DOCUMENTS

| | | | | |
|---|---|---|---|---|
| 8,483,993 | B2* | 7/2013 | Huyse ..................... | G01M 3/00 702/170 |
| 2004/0024483 | A1* | 2/2004 | Holcombe ............. | G06Q 30/02 700/122 |
| 2010/0286937 | A1* | 11/2010 | Hedley ................... | G05B 15/02 702/60 |
| 2011/0313964 | A1* | 12/2011 | Sanchey Loureda .. | G06Q 10/04 706/50 |

(Continued)

OTHER PUBLICATIONS

Huang, QI, et al., "Measurement of Energy, Power Quality and Efficiency in Smart Grid", Innovative Testing and Measurement Solutions for Smart Grid, First Edition, John Wiley and Sons Singapore Pte Ltd., @2015, pp. 147-182. (Year: 2015).*

(Continued)

*Primary Examiner* — Amber A Misiaszek
(74) *Attorney, Agent, or Firm* — Ballard Spahr LLP

(57) ABSTRACT

Methods and systems for providing fluid resources are disclosed. A system or method may comprise developing an accurate fluid resource need that allows for expedited true up of fluid resource deliver from resource suppliers to a utility provider. The system and methods for delivering a fluid resource may include calculating a regression line based on fluid resource usage, and an associated temperature during the usage period, and a forecasted temperature for a future time period when the fluid resource will needed. The regression line may be used to obtain the amount fluid resource needed from resource suppliers for deliver by a utility provider to customers.

20 Claims, 7 Drawing Sheets

(56) References Cited

U.S. PATENT DOCUMENTS

| | | | |
|---|---|---|---|
| 2014/0310049 A1* | 10/2014 | Goel | G06Q 10/083 705/7.24 |
| 2015/0012326 A1* | 1/2015 | Furman | G06Q 10/0637 705/7.23 |
| 2015/0149097 A1* | 5/2015 | Wada | G06Q 10/04 702/45 |

OTHER PUBLICATIONS

PowerMarketsToday, Exelon White Paper Details How AMI Boosted Shopping at BGE. Modern Markets Intelligence, Inc. (MMI). Published on Aug. 5, 2016. Retrieved from the Internet—URL: https://www.powermarketstoday.com/public/1821print.cfm (retrieved on Dec. 1, 2017) (24 pages).

* cited by examiner

SYSTEMS AND METHODS FOR PROVIDING FLUID RESOURCES

CROSS REFERENCE AND RELATED APPLICATION

This application claims the benefit of priority and filing date of U.S. Provisional Application Ser. No. 62/381,805, filed on Aug. 31, 2016, which is incorporated herein by reference in its entirety.

BACKGROUND

In providing fluid resources, such as natural gas and/or liquefied petroleum, to customers by utility determination, there is a need to accurately determine the amount of the resource need. Current methods generally rely on monthly meter readings. These meter readings are broken down into two general groups, volatile months and non-volatile months. In general, during the volatile months, meters are read monthly and for those months, an oversupply/undersupply amount is determined. During the non-volatile months, the oversupply/undersupply is trued up. A full cycle to determine over/undersupply and then distribute the billing over non-volatile time periods can take up to 14 months. During the cycle, the utility company bears the burden and risk of ensuring customers receive the resources as needed, maintaining adequate surpluses to cover any increased needs, and for maintaining appropriate records for government oversight and billing purposes. The invention of smart meters has enabled utility consumption data to be read much more often. Utilities still base their demands based off of historic monthly usage by customers. Even with smart meters, readings are generally provided on midnight each day, which does not match with a standard gas day. The systems and methods disclosed herein enable for accurate forecasting and obtaining fluid resources in greatly reduced time frames, such as being able to obtain fluid resources and complete a true-up in supply within a 48 hour time window.

SUMMARY

It is to be understood that both the following general description and the following detailed description are exemplary and explanatory only and are not restrictive, as claimed.

In various embodiments, fluid resource meters configured to measure an amount of fluid resource usage. The systems and methods may include a supply controller configured deliver gas to the one or more gas meters based on customer need. The supply controller may receive measures of how much of a fluid resource is received from an external resource supplier, receive fluid resource usage data from fluid resource meters and a data collection repository; wherein the data collection repository is configured to store the fluid resource usage data from the fluid resource meters, and determine an amount of fluid resources consumed customers associated with the fluid resource meters during a gas day. The supply controller may also be configured to determine the resource supplier associated with each meters, to determine a variance between the amount of gas consumed by customers associated with the gas meters and the amount of gas received from the external resource supplier. The supply controller may also receive external data such as temperature data from a temperature sensor, database or other system that provides temperature data, determine subgroupings of the fluid resource meters based criteria such as external resource supplier, supplier code, reporting status meters, and a customer class. The supply controller may also be configured to calculate a regression line based on an amount of fluid resource consumed and temperature data it has obtained. The supply controller may also obtain a forecasted temperature to be associated with the fluid resource meters and determine a predicted gas need for the fluid measurement meters based on resource supplier, the regression line, the determined amount of gas consumed by the customers associated with the fluid resource meters, and the forecasted temperature and to request the predicted gas need from the resource supplier.

In various embodiments, the systems and methods may include further include a supply interaction portal that may be configured to communicate with external resource suppliers various data, such as predicted fluid resource need.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
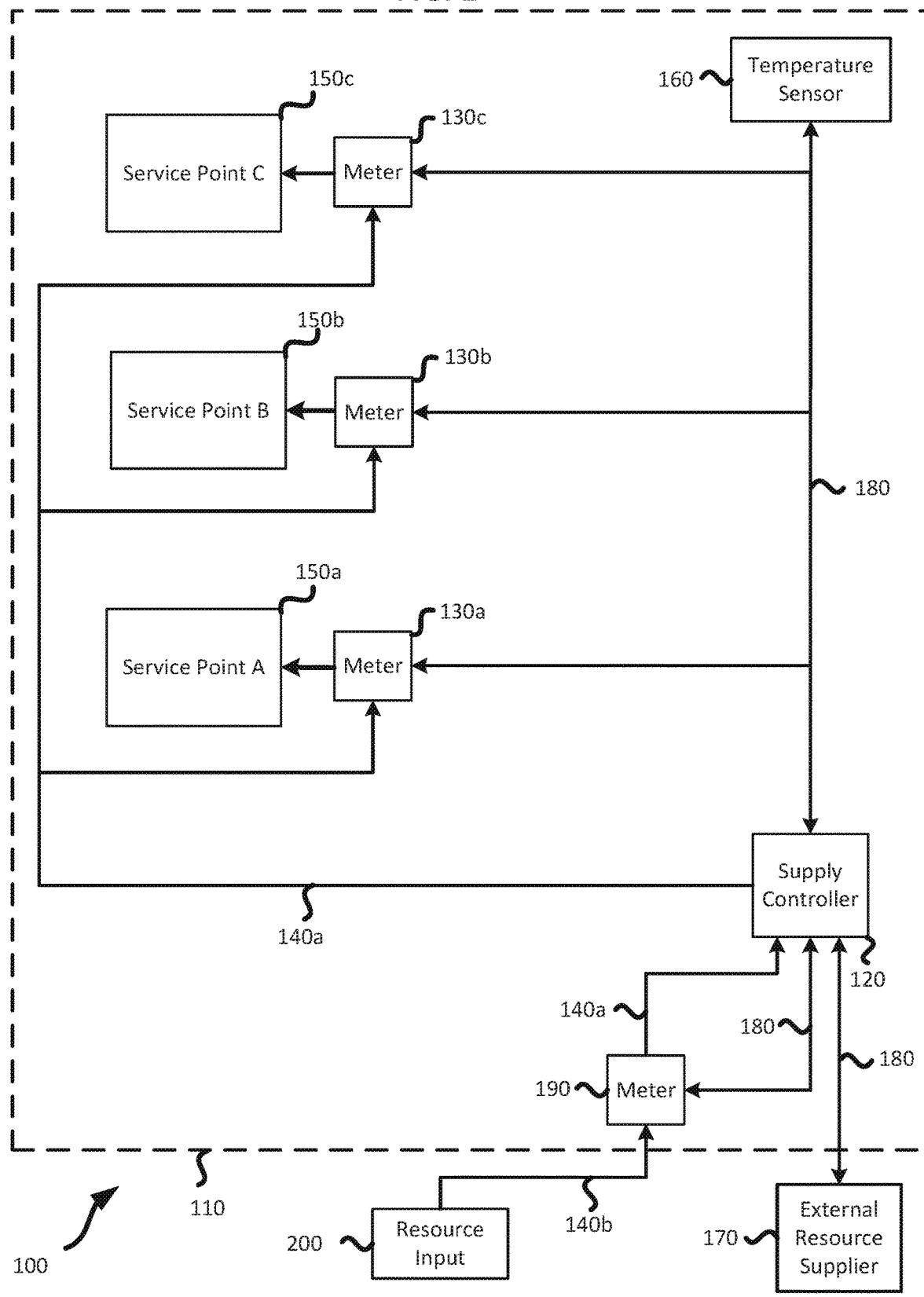
FIG. 1 is a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description and the examples included therein and to the figures and their previous and following description.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices. Servers or offsite storage mediums may also be used to include cloud servers or storage units.

Embodiments of the methods and systems can comprise a first computing device in communication with a second computing device such as a server, for example. The second computing device can be disposed locally or remotely relative to the first device. As an example, the first computing device and the second computing device can be in communication via a private and/or public network such as the Internet or a local area network. Other forms of communications can be used such as wired and wireless telecommunication channels, for example. Other examples include cloud servers or storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to systems and methods for data routing management. In one aspect of the disclosure, a system can be configured to provide services, such as network-related services to a user or customer device. It should be noted the present disclosure can be applicable in any network environment employing a computing device, a server, a user device or other network entity that is involved in the management of communication sessions between devices on a network. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

FIG. 1 is a block diagrams illustrating an example system 100. With reference to FIG. 1, exemplary system 100 illustrates various components of a system for delivery of fluid resources from suppliers and/or sources, through a utility network 110 to customer premises. FIG. 1 also includes various communication means between components. Utility network 110 may include components such as distribution lines, meters, valves, computing systems for monitoring and controlling resources in the network and their delivery to customer premises. Utility network 110 includes at least one supply controller 120. Supply controller 120 oversees the function of utility network 110. Supply controller 120 may take various forms, from one or more desktop computers, to mainframes, or servers. Supply controller 120 runs various programs and either includes or has access to memory for storing customer information, resource usage data, and other information necessary for delivery of resources to customers. Supply controller 120 may obtain resource usage data from resource usage meters located at customer premises 150a, 150b, and 150c. Service points may include resource meters 130a, 130b, and 130c. Any one or more of resource meters 130a,b,c may be a smart meter. Smart meters may communicate with supply controller 120 by communication link 180. Other communication links may include links to sensors or devices contained within or outside of utility network 110. Communication link 180 illustrates a communication link to a temperature sensor 160 that is located outside of utility network 110. Similarly, communication link 180 illustrates a communication link between supply controller 120 and resource supplier 170. Each communication link 180 may be a wired connection, wireless connection, or combination therefore.

In various embodiments, temperature sensor 160 may be located within or be a part of utility network 110. Temperature sensor 160 may also be integrated into a smart meter 130. Multiple smart meters 130 may be associated with a single temperature sensor. In an example, temperature sensor 160 may be assigned to a geographic region and any service points contained therein, such as resource meters 130a,b,c. Resource meters 130a,b,c may be a different supplier code and be associated with a single temperature sensor reading. System 100 may have access to multiple temperature sensors or access to one or more databases which may provide temperature data for various locations and/or areas that customer premises are located.

System 100 can include resource supply lines 140a and 140b. Resource supply line 140b is a supply line into utility network 110 from outside of the utility network, such as from a resource input 200. Utility network 110 may have one or more resource supply lines 140b. Each resource supply line 140b may correspond to one or more resource input 200. The supply from resource input 200 may be controlled by one or more external resource suppliers 170. An external resource supplier 170 may have associated with it one or more resource inputs 200. Each resource supply line 140b may have an inbound resource meter 190 for determining an amount of resource provided by a resource supplier 170. Inbound resource meter 190 may be outside, on the border of, or within utility network 110. Inbound resource meter 190 may able to communicate with supply controller 120. System 100 may have multiple inbound resource meters 190. Resource lines 140a represent resource lines within utility network 110. Resource supply lines 140b include resource lines providing a resource to customer premises, service point 150a,b,c. For simplicity of illustration in FIG. 1, customer premises 150a,b,c are illustrated within utility network 110. Service point 150a,b,c are generally not part of the utility network itself. However, in various embodiments they may be part of the utility network 110. Each service point 150a,b,c has a corresponding resource meter 130a,b,c. In various embodiments, each resource meter 130a,b,c may be within, on the border or outside of utility network 110. Each resource meter 130a,b,c may communication directly or indirectly with supply controller 120.

In various embodiments, one or more of resource meters 130a,b,c may be a smart meter. Each resource meter 130a,b,c may provide data, such as resource usage readings, to one or more central collection repositories. These repositories may be outside of utility network 110. In various embodiments resource meter data collection may be provided by a third party. Third parties may include parties that maintain, operate, and/or install resource meters or convert resource meters to smart meters. Third parties may also provide data retention and repository services as well.

Figure 2:
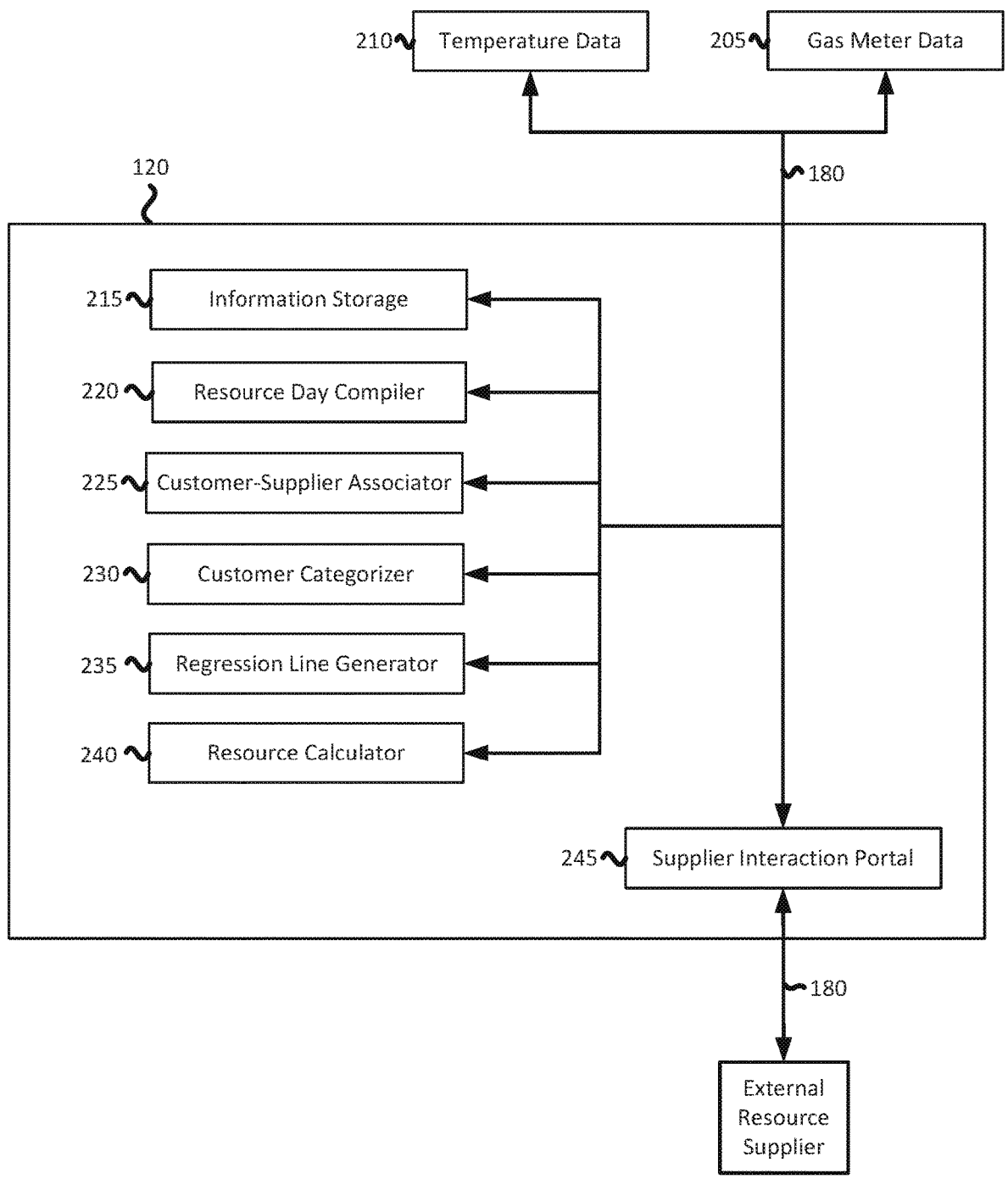
FIG. 2 is a block diagram illustrating example supply controller.

With reference to FIG. 2, block diagram illustrating example supply controller 120. Supply controller 120 may have various hardware and software components. Of the components illustrated may be implemented in hardware, software, or in a combination thereof. Supply controller 120 takes input from various components within and without utility network 110. These may include inputs from external sources such as gas meter data 205 and/or temperature data 210. In various embodiments, gas meter data 205 may be supplied by a third party, retrieved from an external repository or database, or maintained in memory or a database internal to supply controller 120. For external data, supply controller 120 may utilize communication links 180. Supply controller 120 may send or receive data to various components as necessary. Supply controller 120 may include software and hardware for controller components of utility network 110 to direct resources within the utility provider network. Information storage unit 215 may be an internal database containing customer account information, utility provider information, customer and meter association information, and customer premises location. Information Storage unit 215 may, in various embodiments be an internal memory, internal database, external memory, external database, or any combination thereof. Either or both of temperature data and gas meter data may be supplied directly to Information Storage unit 215.

In general, a standard gas day is a 24 hour period starting at 10 am Eastern Time on a first day, and ending at 10 am Eastern Time the next day. This may not correspond to gas meter readings. Resource day compiler 220 may receive gas meter data and compile data from one or more readings to match a standard gas day, or for any desired time frame.

Customer-supplier associator 225 may associate a customer account with a specific resource supplier. In various embodiments, customers may only have a single choice for a utility provider or from multiple utility providers. In either case, a customer may be able to select the supplier of the resource the utility provider delivers. Customers may also change resource suppliers at various times to include between meter readings. The customer-supplier associator 225 may manage customer selection of a resource supplier. This may include when a customer changes from supplier to another. Data from customer-supplier associator 225 may be provided to resource day compiler 220 in order to obtain a time period for a non-standard gas day. Data from customer-supplier associate may also be stored in information storage unit 215.

Customer categorizer 230 may determine a supplier code a service point or customer account may be assigned. Supplier codes may be based on building characteristics or usage. Examples of characteristics or usages may include building type, building size, building age, build location, building elevation, construction type, designed building use, heating method, cooling method, general usage time periods, zoning designations, internal area, internal heated area, internal cooled area, temperature range the location may experience, resource rate schedule, rate class, or any combination of these or other categories. Example customer categories may include residential customer premises without gas heating, residential customer premises with gas heating, commercial without gas heating, commercial with gas heating, and commercial with gas utilities but no gas heating. An assigned category may change over time, when new categories are added or categories are removed. Customers who do not have smart resource meters, or are in areas in which daily communication with meters is not possible, may still be categorized into a supplier code. In this way, a predicted gas need may be calculated for the customer even though that customer's usage data may not be used in generation or updating of a regression line by regression line generator 235. A predicted gas need may be expressed in various forms, such as in Dekatherms. A service point may have multiple supplier codes associated with it. An example may be a service point at a store. The service point may have a supplier code as being a commercial location, it may also have a supplier code that identifies it as a building with less than 5 stories, a supplier code for a specific geographic area, and other supplier code categories. Supplier codes may be subdivided. An example may a supplier code that covers all restaurants, which may be subdivided into restaurants serviced by a particular supplier, restaurants of different size based on square footage, or restaurants based on hours when they operate.

Regression line generator 235 takes in data to generate a regression line fit to data for a customer or a grouping of customers. The regression line may be linear, quadratic, a least squares fit, or other type of mathematical fit that best approximates customer data. Data used includes actual gas usage, and associated temperature for a number of previous readings. The number of readings may be adjusted. For example, a minimum number of readings may be set at the past seven days. If one or more data points are missing, regression line generator 235 may identify data from other customers, other customer groupings, or based on any category to supplement the data to calculate a regression line. Regression line generator 235 may generate a regression line for individual customers, customer categories, a subset of one or more customer categories, a subset or one or more customer categories, sub groupings of customer categories within a customer category, or based on any other grouping of data, such as any category used by customer categorizer 230. Regression line generator 235 may break down or combine grouping of customers or supplier code used by customer categorizer 230 into smaller or larger groups. Regression line generator 235 may use customer data from one or more suppliers to generate a regression line. An example may be to subdivide a supplier code of residential single family homes that use gas heat based on customer-supplier associations and to only include a subgrouping that are located within a limited geographic area for one or more specific suppliers. A subgrouping may include a number of meters that are reporting data from a larger group which has been grouped or may have been subgrouped based on another category. In such cases, the regression line may be representative for the larger grouping based on the data from the subgrouping. Regression line generator 235 may exclude various data points, such as outlier data points that create too large of an error margin. Regression line generator 235 may also determine if one or more data points are missing or if additional data may reduce error margins to be within an acceptable margin. Where additional data is desired, data for customers that may be categorized similar to the selected customer grouping may be identified and used to supplement the data for the current calculation. The regression line may be used to determine a predicted gas need for a grouping of customers. The regression line may be used to determine a gas need for individual customers, all customer, or a subgrouping of customers used in calculating the regression line, representative for customers or grouping of customers not included in the calculation or any combination thereof. Multiple predicted gas needs may be compiled to determine a total predicted gas need. A total predicted gas need may be for all customers, or any grouping, such as customers serviced by a single resource supplier.

Resource calculator 240 can determine a variance between an amount of resources supplied by a resource supplier and an amount committed to by a resource supplier. In various embodiments, resource calculator 240 may be in communication with one or more resource meters 190. In various embodiments, resource calculator 240 may be a part of inbound resource meter 190 and communicate with supply controller 120 and provide information on any variances between a committed amount of resource and an actual amount of resource supplied to utility network 110. Resource calculator 240 may receive or provide data to or from components of supply controller 120, to include information storage 215, resource day complier 220, or regression line generator 235. Resource calculator 240 may also generate data such as variance between predicted resource need and actual customer resource consumption and provide these data points to regression line generator 235 for regression line generator to update regression lines that may be used to determine resource needs.

Supplier interaction portal 245 allows resource suppliers to interact with supply controller 120 in order to receive commands, data or instructions from supply controller 120 or to send data, commands, or requests to supply controller 120. Supplier interaction portal 245 may be within supply controller 120 or a separate component, such as an internet website, software installed on another computer, such as one at a resource supplier that communicates with supply controller 120. Supplier interaction portal 245 may provide suppliers with access to information stored in various components, or functions of various components of supply controller 120. This may include access data in information storage unit 215, gas data compiler 220, customer-supplier associator 225, and/or customer categorizer 230. Supplier interaction portal 245 may also provide information to resource suppliers 170 such as predicted resource need for the particular resource supplier. It may also receive data from resource suppliers 170 such as an amount of resource a supplier may commit to providing, such as an amount of gas for a particular gas day.

Figure 3:
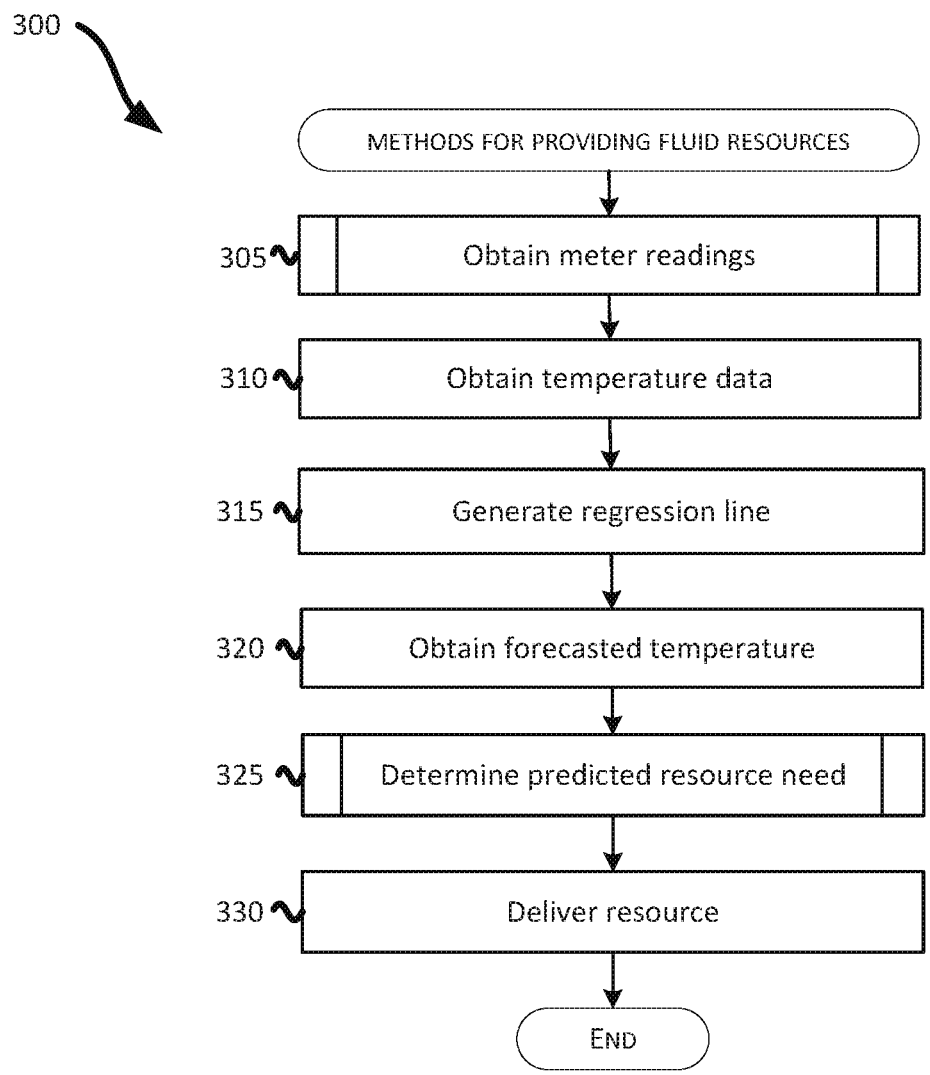
FIG. 3 is a flowchart illustrating an example method.

With reference to FIG. 3, a flowchart illustrating an example method 300 is shown. Method 300 may also be applied to any other resource. At step 305, meter reading data is obtained. Resource meter reading may include a gas meter reading received from a smart meter 130 or from a data repository. The resource meter reading may be associated with a customer account. This association may be included in a data base, or with the reading data sent from smart meter 130. At step 310, temperature data may be obtained. In various embodiments, a temperature data may be obtained from a temperature sensor 160. Temperature data may also, or in the alternative, be obtained from databases or purveyors of such data, to include the National Weather Service, or online temperature data repositories. In various embodiments, multiple temperature readings may be obtained for a single time period to be associated with a resource meter reading. This may include obtaining temperature data every hour from one or more sources and determining an average temperature for the time. In various embodiments a single temperature, such as the high temperature for the day, may be obtained. In step 315, a regression line based on a number of resource meter readings and associated temperature data is generated. A minimum number of resource meter readings, such as the past seven days, may be required to generate a regression line. In step 320, forecasted temperature data for the day on which a resource is desired is obtained. In step 325, the amount of resource needed is determined. This may be based on the regression line, and the forecasted temperature. The amount of resource needed may be for an individual customer, one or more supplier codes, or for a set of customers, such as those serviced by a particular supplier. Once a resource need is determined, the resource may be obtained. This may be by supply controller 120 communicating with resource suppliers to order the desired amount of resources. Obtaining the resource needed may include any combination of supply controller 120 activating components of utility network 110 to release stored resources, diverting resources within utility network 110, and requesting additional resources from resource suppliers. At step 330, the resource is delivered to service points. As the resource is delivered to customers, meter readings may be obtained and the process repeated again.

Predicted resource need for each customer serviced by a resource supplier may be accumulated to determine a predicted total resource need to be requested from a resource supplier. The predicted total resource need to be requested from a resource supplier may take into account any variances between actual customer usage and by amounts previously provided by the resource supplier into utility network 110. This may include surplus and undersupply by the resource supplier. In this way, true up periods for surplus and undersupply can be addressed in a matter of a day as compared to the previous methods taking up to 14 months.

In an example, an office building complex had a predicted resource need for a Friday that was supplied into utility network 110 by resource supplier 170. The office building complex did not use as much as predicted on that Friday, leaving a surplus supplied by the resource supplier into utility network 110. The next day, Saturday, the calculated need is for the office building complex is much lower, and leaves an expected surplus provided by the resource supplier as compared to the predicted resource need for that Saturday. The resource supplier may also have be the supplier for residential customers, such as to an apartment complex. The predicted surplus for Saturday that has already been provided by the resource supplier into utility network 110 may be credited by supply controller 120 towards the total predicted resource need to be supplied by resource supplier for Saturday.

In various embodiments, if customer usage exceeds predicted resource need for a supplier, surplus supply from a different supplier may be assigned to those customers with a resource need deficiency. Supply controller 120 may be able to, through for example supply controller 120, and other components such as resource calculator 240, resource day complier 220, and information storage unit 215, track which resources are assigned from one resource supplier to customers of another and then bill each resource supplier appropriately for the appropriate resources.

Figure 4:
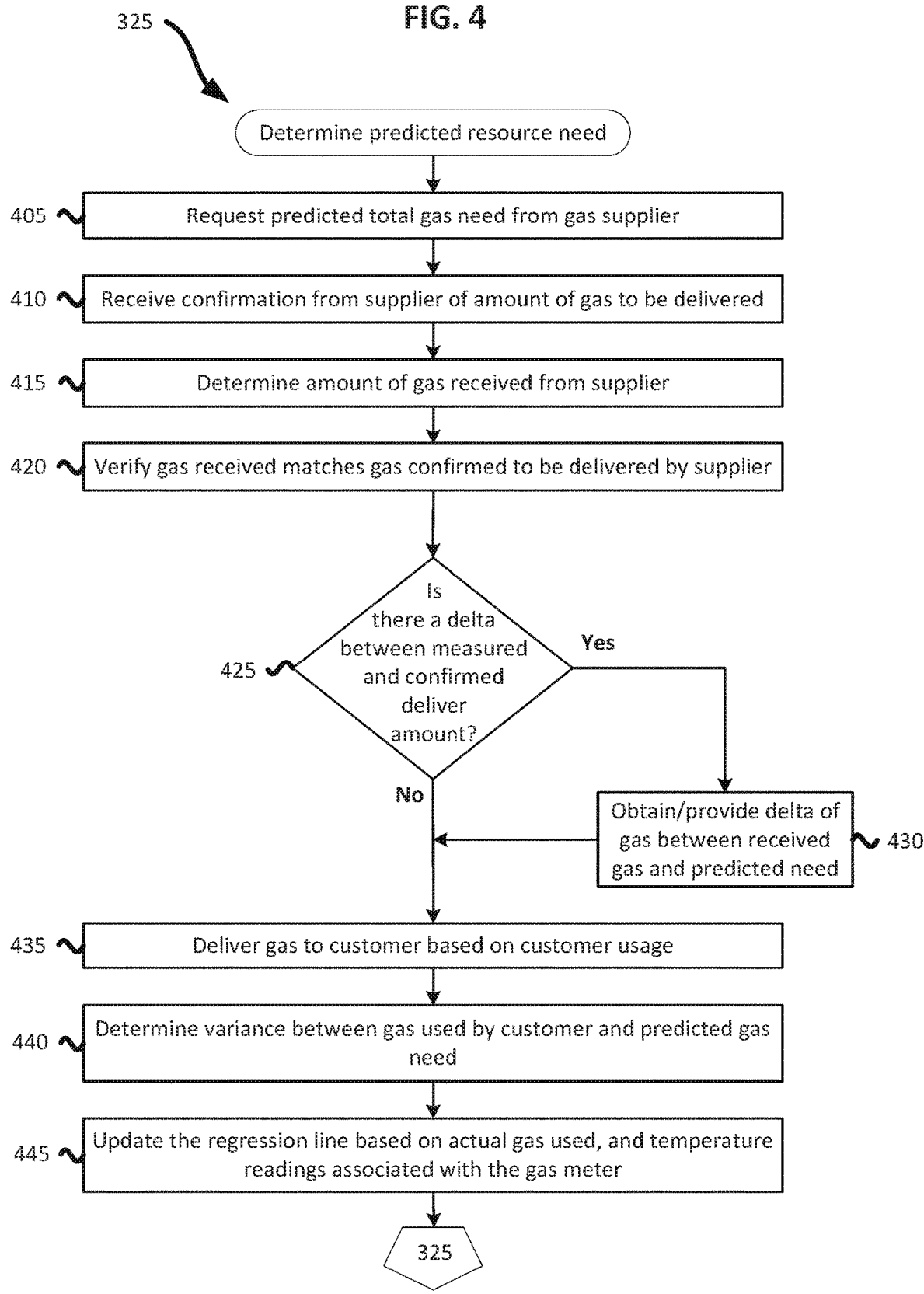
FIG. 4 is a flowchart illustrating another example method.

With reference to FIG. 4, flowchart illustrating another example method, method 325 for determining predicted resource need. Example method 325 is illustrated in the context of natural gas as the fluid resource. It will be understood by one of ordinary skill in the art that any other fluid resource, such as liquefied petroleum gas, propane, naphtha, fossil fuel, may be substituted without a change to the basis of invention. FIG. 4 illustrates supply from a single resource supplier for convenience and clarity. Method 325 may be implemented for each resource supplier 170. Further, similar to method 300, method 325 may be implemented in the context of any fluid resource. Method 325 may be implemented based on a total resource need to be requested from a resource supplier. In step 405, a predicted total resource need is requested from a resource supplier. In step 410, resource suppliers provide confirmation of an amount of gas to be delivered by each resource supplier into utility network 110. In step 415, an amount of gas received into utility network 110 from the supplier is determined. In determination block 425, it is determined if there is a delta between the measured amount of gas supplied from a resource supplier into utility network 110 and the confirmed delivery amount of gas as agreed to by the resource supplier. If there is a delta, (e.g., determination block 425="yes"), such as an undersupply by the resource provider, a utility provider would need to obtain the undersupplied amount from another source in block 430. This may be accomplished, for example, by having supply controller 120 release stored resources into utility network 110, determining an oversupply by other resource providers and diverting this amount to customer needs of the undersupplying resource provider. Similarly, if there is a delta (e.g., determination block 425="yes"), but there is an oversupply, in step 430, the oversupplied resources may be ear marked to cover resources for resource suppliers who have undersupplied, or it may be stored for later use. In cases where there is an oversupply or an under supply by a certain margin as determined by resource calculator 240, penalties may be imposed against such resource suppliers. Such penalties may include requiring a surplus to be provided to be maintained in storage, requiring a percentage increase or decrease in amount of resource requested, or fines against the resource supplier. Once the predicted gas need has been accounted for in step 430, or if there is no delta (e.g., determination block 425="no"), then gas is delivered to customers based on customer usage in step 435. In step 440, a variance between gas used by customers and predicted gas need is determined. The variance may be determined based on any one or more of a customer by customer basis, customer category basis, supplier basis or any other category determined by customer categorizer 230 or in step 320 of method 300. This variance is generally determined by resource calculator 240. In step 445, the regression line is updated based on actual gas used and temperature data associated with gas meter. The regression line may also be updated using variance data between actual gas used, predicted gas need, and temperature data associated with the gas meter. The forecasted temperature may then be added to obtain the predicted gas need. The data used to update the regression line in step 445 may be stored before or after the regression line may be updated. In an example, the predicted gas need may be communicated by supplier interaction portal 245 to resource suppliers 170 at an early enough time, such as 7 am Eastern Time, of the day the gas need is predicted for. The time window could allow resource suppliers 170 to confirm an amount of gas they will deliver for that gas day by 10 am Eastern Time, the start of that gas day.

Figure 5:
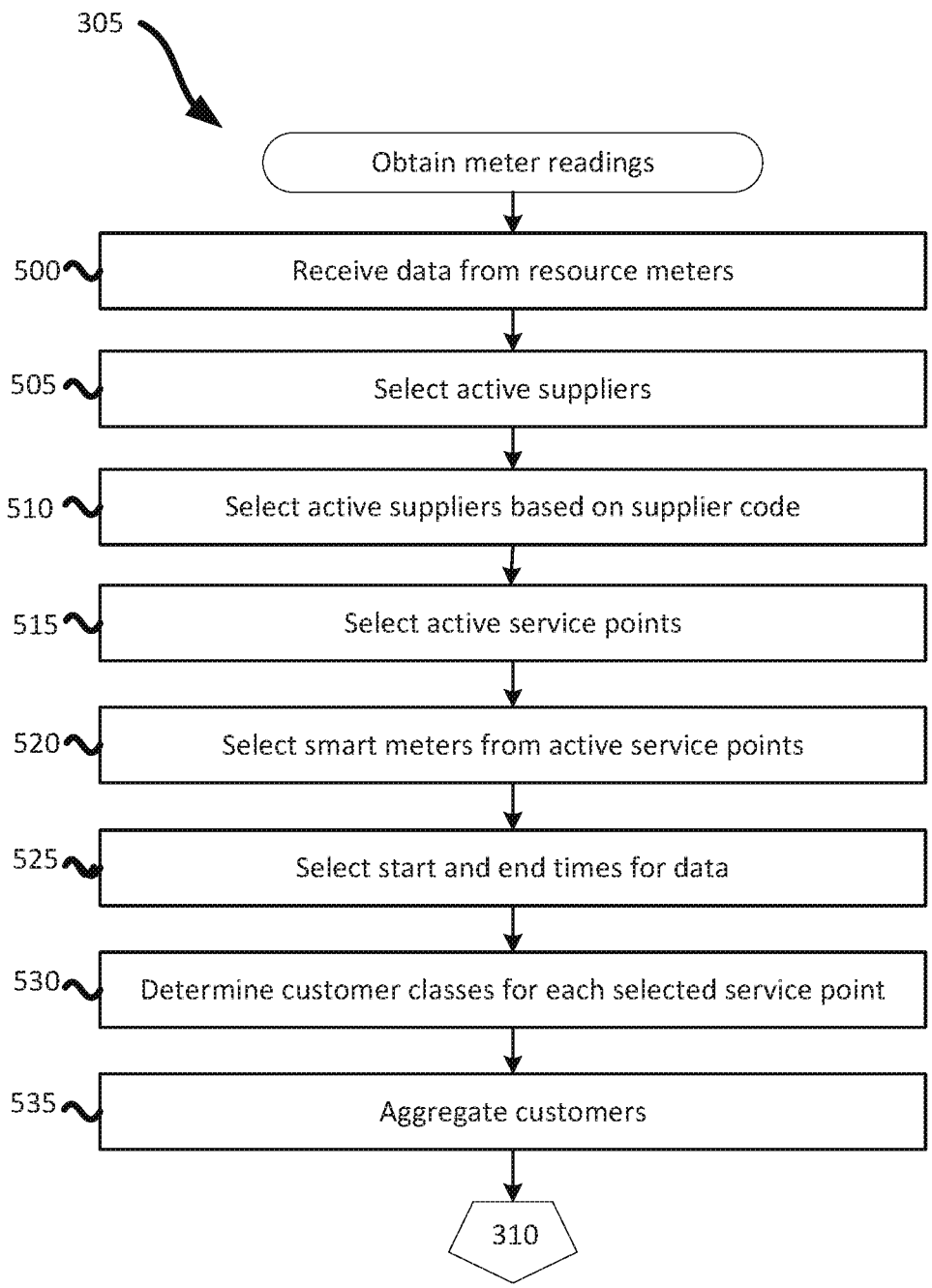
FIG. 5 is a flowchart illustrating another example method.

With reference to FIG. 5, flowchart illustrating another example method, method 305 for obtaining meter readings.

FIG. 5 illustrates aggregation of data that may be used to develop a regression line. In step 500, data is received from resource meters 130. The data from resource meters 130 may be stored in a data base, such as information storage unit 215. The resource meter readings may be tagged with various data, such as supplier by customer-supplier associator 225, and/or supplier code(s) by categorizer 230. In step 505, active suppliers are selected. This may be accomplished by compiling a list of all suppliers of all resources, filtering the list to active suppliers. The active suppliers list may further be filtered down a single resource, such as for natural gas. A list of active suppliers may also be determined through supplier interaction portal 245, by determining which suppliers have committed to supply resources for the time period. In step 510, active suppliers are selected based on their supplier code. This may be done by customer categorizer 230 or be based on data associated with a customer account that is stored in information storage unit 215. A single supplier may have multiple supplier codes. Supplier codes may be assigned based on a supplier code assigned by customer categorizer 230. Multiple suppliers may be assigned a single supplier code. For example, a supplier code may be for all commercial office buildings with gas heating that are greater than five stories in height in the service area of the utility provider. In step 515, active service points are selected. Active service points are locations to which a resource that is provided by the utility provider is to be provided. A utility provider may provide multiple resources, e.g., a service provider who provides natural gas and electricity. In such a case, the service points for the desired resource may be selected, e.g., only those service points receiving gas. In step 520, from the selected service points, those service points with smart meters for the resource selected are identified. In step 525, the start and end times for data are selected. This may be accomplished by resource day compiler 220, or by other components based on the span of time the data is desired for. The time period may be for a standard gas day or for a longer or shorter period of time if desired. It may be necessary to compile data from multiple readings or parts readings in order to obtain a reading for the selected time period. This may be the case to generate a single gas day meter reading. The readings may be obtained directly from meters or from stored data in information storage unit 215. In step 530, a customer class is determined for each of the smart meters for the time period the data has been selected. The customer class may be determined by customer categorizer 230. The customer class may be determined based on rate schedules, or other rules. Additional rules may include how often meter readings are taken, supply requirements, customer type e.g., residential, commercial, industrial, with or without gas heating. In step 535, customers are aggregated. This may include aggregating customers based on any one or more of a one or more resource suppliers, one or more supplier codes, some or all customers of a customer class, all customers serviced within the time period, or for any other category selected. In an example, all customers for a resource supplier may be aggregated. Such an aggregation may provide actual gas usage for a specified period of time for a supplier. It may also provide how may gas meters were used by each customer class and how many were smart meters. This data, and any associated temperature data, may be used to generate a regression line. The regression line may be used with forecasted temperature data to determine a predicted gas need by resource calculator 240. The predicted gas need may be calculated based on customer class, supplier, or other subcategories. A predicted gas need may be calculated for a resource supplier for all service points serviced by that supplier, though the data may be based partly or entirely on smart meter readings. In another example, a predicted gas need for a specific customer category may be calculated for each resource supplier. In each case, the predicted gas need may be obtained by supply controller 120 from various sources.

Figure 6:
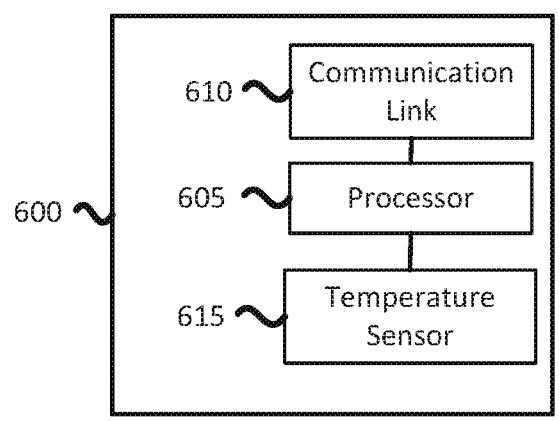
FIG. 6 is a block diagram illustrating an example smart gas meter device which the present methods and systems may utilize.
Figure 7:
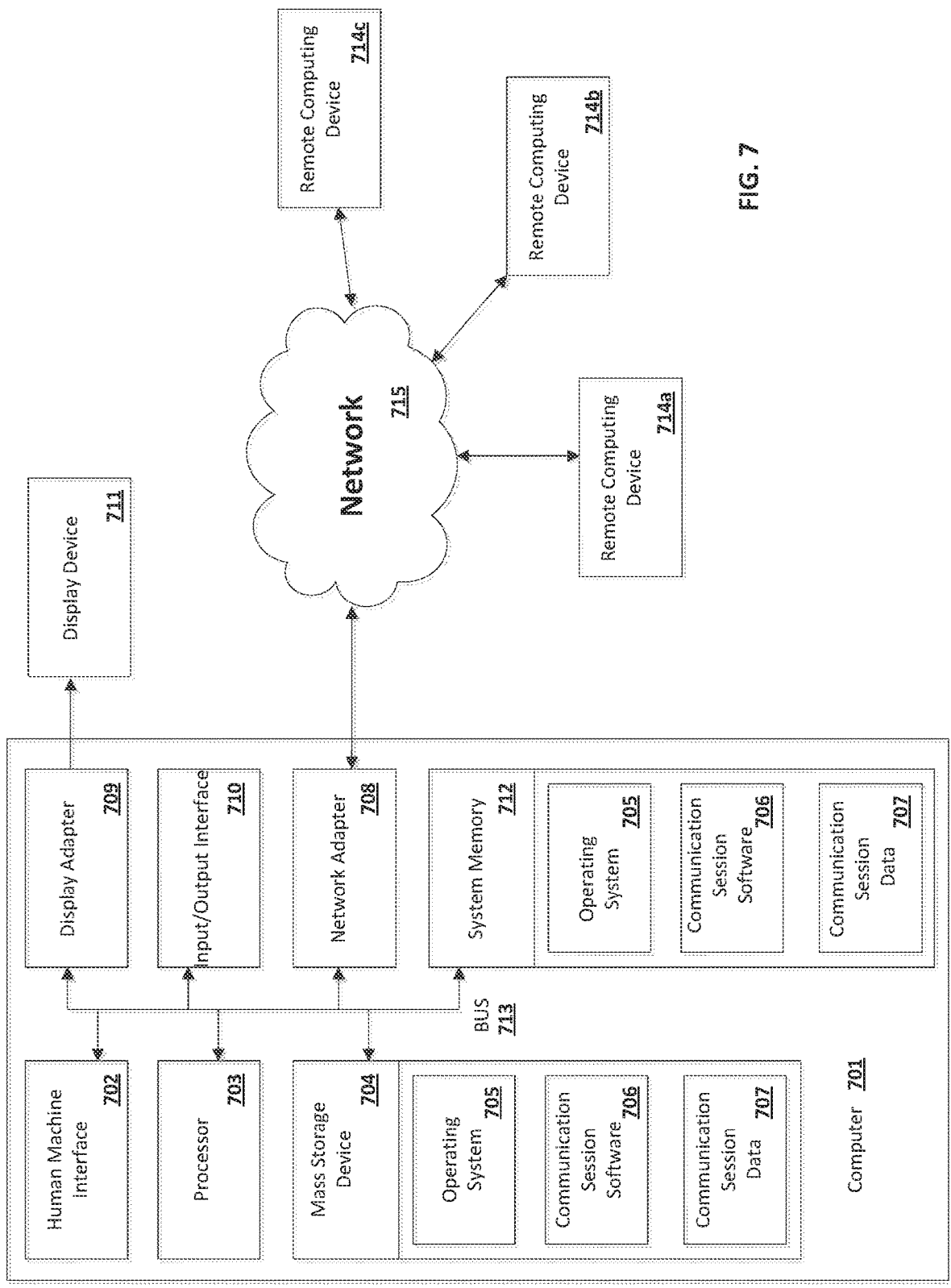
FIG. 7 is a block diagram illustrating an example computing device in which the present methods and systems can operate.

FIG. 6 illustrates an exemplary smart meter that may be a component of a system or for performing the disclosed methods. By way of example, smart meter 600 is similar to smart meters known in the art, such as an AMI certified smart gas meter. Smart gas meters generally have a resource feed in line and a resource feed out line. A non-smart meter may be retrofitted with smart meter 600 to enable reading and communication with a conventional meter. Alternatively, smart meter 600 may have a processor 605 embedded in it to enable all necessary functionality for a smart meter. The processor 605 can be part a computer as illustrated in FIG. 7. The processor 605 enables smart meter 600 to communicate with an external reader via communications link 610. Communication link 610 may be a hardwire link, or a wireless communication link that smart meter 600. Communication link 610 may use any form of wireless communication to include Wi-Fi, Bluetooth™, satellite connection, cellular networks or other wireless communication standard for sending and/or receiving smart meter data and/or commands. Smart meter 600 may communicate with other smart meters via either communication link 610. Smart meter 600 may, for example, be a smart gas meter that connects and communicates to a central server via another smart gas meter or a smart electric meter. Smart meter 600 may also contain the ability for obtaining temperature data for its location or in the surround area. This may include an option temperature sensor 615. Additionally or in the alternative, smart meter 600 may obtain temperature data from other sources, such as the internet, other temperature sensors, or databases via communication link 610. In various embodiments, smart meter 600 may exclude temperature sensor 615. In these embodiments, temperature data may be obtained by a computing device that receives gas usage data from smart meter 600. In various embodiments, smart meter data or readings may be transmitted by smart meter 600 without temperature data.

FIG. 7 is a block diagram illustrating an exemplary operating environment for performing the disclosed methods. In an exemplary aspect, the methods and systems of the present disclosure can be implemented on computer 701 as illustrated in FIG. 7 and described below. By way of example, supply controller 120 of FIG. 1 and FIG. 2 can be computer 701 as illustrated in FIG. 7. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples include programmable consumer or commercial electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the processor 703 to the system memory 712. In the case of multiple processors 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, communication session software 706, communication session data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data, such as communication session data 707, and/or program modules, such as operating system 705 and communication session software 706, that are immediately accessible to and/or are presently operated on by the processor 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and communication session software 706. Each of the operating system 705 and communication session software 706 (or some combination thereof) can comprise elements of the programming and the communication session software 706. Communication session data 707 can also be stored on the mass storage device 704. Communication session data 707 can be stored in any of one or more databases known in the art. Examples of such databases comprise, DB2®, Microsoft® Access, Microsofte SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processor 703 via a human machine interface 702 that is coupled to the system bus 713, but can be connected by other interface and bus structures, such as a parallel port, game port, an IFEE 1394 Port (also known as a Firewire port), a serial port, or a universal serial bus (USB).

In yet another aspect, a display device 711 can also be connected to the system bus 713 via an interface, such as a display adapter 909. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components, such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 705 are illustrated herein as discrete blocks, although it is recognized that such programs and components reside at various times in different storage components of the computing device 701, and are executed by the data processor(s) of the computer. An implementation of communication session software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
    a temperature sensor configured to generate temperature data;
    one or more fluid measurement devices, wherein each fluid measurement device of the one or more fluid measurement devices is configured to determine, based on an amount of usage of a fluid resource, fluid resource usage data;
    a computing device configured to:
        determine, based on the fluid resource usage data associated with each fluid measurement device of the one or more fluid measurement devices, an amount of the fluid resource consumed at a plurality of customer locations associated with the one or more fluid measurement devices;
        determine, based on the temperature data and the amount of the fluid resource consumed at the plurality of customer locations, a regression line;
        determine a forecasted temperature associated with the one or more fluid measurement devices;
        determine, based on the regression line and the forecasted temperature, an estimated fluid resource value;
        request from a fluid resource supplier, based on the estimated fluid resource value satisfying a threshold, additional fluid resource; and
        send, to the plurality of customer locations, the additional fluid resource.

2. The system of claim 1, wherein the fluid resource is one or more of natural gas propane, or liquefied petroleum gas.

3. The system of claim 1, wherein one or more of the one or more fluid measurement devices comprise one or more a smart gas meters or flow meters.

4. The system of claim 1, further comprising a usage data collection repository, wherein the usage data collection repository is configured to:
    receive, from the one or more fluid measurement meters, the fluid resource usage data; and
    send the fluid resource usage data to the computing device.

5. The system of claim 1, wherein the computing device is further configured to:
    determine, based on one or more of the external resource supplier, a supplier code, a reporting status of the one or more fluid measurement devices, and a customer class, a subgrouping of the one or more fluid measurement devices; and
    determine, based on the amount of the fluid resource consumed at customer locations of the plurality of consumers locations that are associated with the subgrouping of the one or more fluid resource measurement devices and the temperature data, the regression line.

6. The system of claim 5, wherein the computing device is further configured to determine, based on the regression line, a portion of the fluid resource usage data received from the one or more fluid resource devices associated with the subgrouping of the one or more fluid resource devices, and the temperature data, an estimated resource need for the subgrouping of the one or more of fluid resource devices.

7. The system of claim 5, wherein the supplier code is based on one or more of a building type, a building size, a building age, a build location, a building elevation, a construction type, a designed building use, a heating method, a cooling method, a general usage time period, a zoning designation, an internal area, an internal heated area, an internal cooled area, a temperature range a location may experience, a resource rate schedule, or a rate class.

8. The system of claim 1 further comprising a user interface configured to facilitate display of the estimated fluid resource value.

9. The system of claim 8, wherein the computing device is further configured to:
generate the user interface;
receive via the user interface a confirmation of an amount of fluid resource the fluid resource supplier commits to deliver;
receive a portion of the amount of fluid resource;
determine a variance between the amount of fluid resource the fluid resource supplier commits to deliver and the received portion of the amount of fluid resource; and
request, based on the variance indicating an undersupply of the amount of fluid resource the fluid resource supplier commits to deliver, the undersupply amount from another source.

10. The system of claim 8, wherein the computing device is further configured to:
facilitate, based on a fluid resource requirement, a required amount of fluid resource to the one or more fluid resource devices;
determine a variance between a portion of the required amount of the fluid resource that is sent to the one or more fluid resource devices and estimated fluid resource value; and
update, based on the variance, the regression line.

11. A method comprising:
determining by a computing device, based on fluid resource usage data received from a fluid measurement device, an amount of a fluid resource consumed a a location associated with the fluid measurement device;
determining, based on the amount of the fluid resource consumed at the location associated with the fluid measurement device and temperature data, a regression line;
determining, based on the regression line and a forecasted temperature, and estimated fluid resource value, and
facilitating, based on the estimated fluid resource value, delivery of an amount of fluid resource to the location associated with the fluid measurement device.

12. The method of claim 11, wherein the fluid resource comprises one or more of natural gas, propane, or liquefied petroleum gas.

13. The method of claim 11, wherein the fluid measurement device comprises one or more of a smart gas meter or a flow meter.

14. The method of claim 11, wherein the amount of the fluid resource consumed at the customer location comprises an amount of fluid resource consumed at the customer location for more than one day, and the temperature data indicates a plurality of temperatures occurring for more than one day.

15. The method of claim 11, wherein determining the regression line is further based on an amount of fluid resource consumed at a plurality of customers locations associated with one or more of a resource supplier, a supplier code, or a customer class.

16. The method of claim 11, wherein facilitating the delivery of the amount of the fluid resource comprises sending a request to resource supplier for the amount of the fluid resource.

17. The method of claim 11, further comprising:
receiving, from a resource supplier, an indication of an amount of the fluid resource the resource supplier commits to provide;
determining an amount of the fluid resource that is received from the resource supplier;
determining a variance between the amount of the fluid resource the resource supplier commits to provide and the amount of the fluid resource that is received from the resource supplier; and
determining, based on the variance, one or more of an oversupply of the fluid resource associated with the resource supplier or an undersupply of the fluid resource associated with the external resource supplier.

18. The method of claim 11, further comprising receiving the temperature data from a temperature sensor associated with the customer location.

19. The method of claim 11, further comprising:
facilitating delivery of a required amount of the fluid resource to a plurality of customer locations based on usage information;
determining a variance between the amount of the fluid resource to be delivered to the location associated with the fluid measurement device and the required amount of the fluid resource; and
updating, based on the variance, the regression line.

20. One or more computer-readable media storing processor-executable instructions that, when executed by at least one processor, cause the at least one processor to:
determine, based on fluid resource usage data associated with each fluid measurement device of one or more fluid measurement devices, an amount of a fluid resource consumed at a plurality of customer locations associated with the one or more fluid measurement devices;
determine, based on temperature data associated with the one or more fluid measurement devices and the amount of the fluid resource consumed at the plurality of customer locations, a regression line;
determine a forecasted temperature associated with the one or more fluid measurement devices;
determine, based on the regression line and the forecasted temperature, an estimated fluid resource value;
request from a fluid resource supplier, based on the estimated fluid resource value satisfying a threshold, additional fluid resource; and
send, to the plurality of customer locations, the additional fluid resource.

* * * * *